Oct. 6, 1953   R. WIDERÖE   2,654,838
IMPULSE CIRCUIT
Filed Sept. 3, 1948   2 Sheets-Sheet 1

Inventor
Rolf Wideröe
By Pierce, Scheffler & Parker
Attorneys

Oct. 6, 1953  R. WIDERÖE  2,654,838
IMPULSE CIRCUIT
Filed Sept. 3, 1948  2 Sheets-Sheet 2
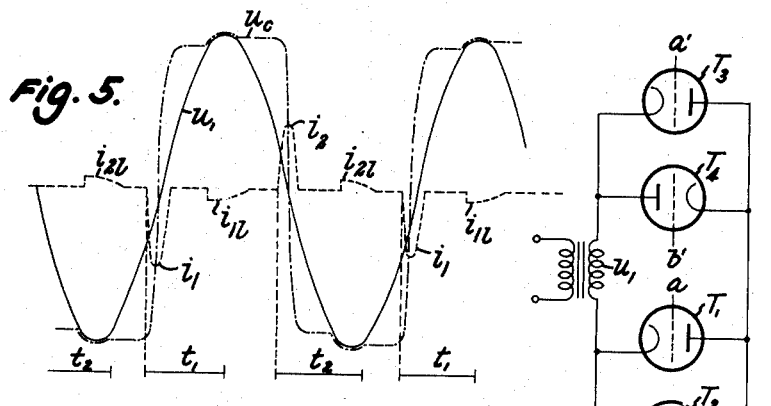
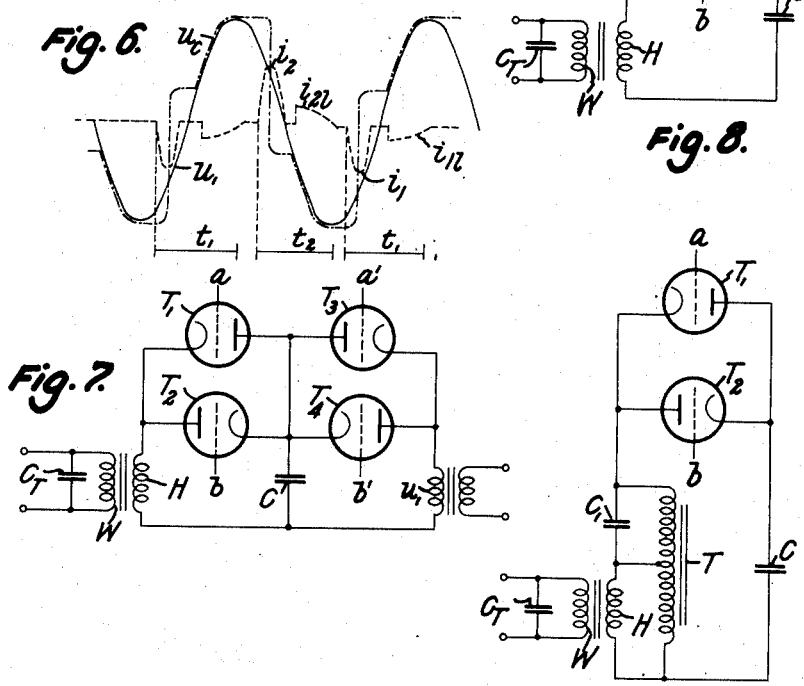
Inventor
Rolf Wideroe
By Pierce Schiffler & Parker
Attorneys Patented Oct. 6, 1953

2,654,838

UNITED STATES PATENT OFFICE 2,654,838

IMPULSE CIRCUIT

Rolf Wideröe, Zurich, Switzerland, assignor to Aktiengesellschaft Brown, Boveri & Cie, Baden, Switzerland, a joint-stock company Application September 3, 1948, Serial No. 47,641
In Switzerland September 6, 1947

2 Claims. (Cl. 250—27)

The present invention relates to impulse circuits and in particular to an improved arrangement for periodically producing current pulses of brief duration.

There are many types of electrical apparatus which require periodic current pulses. To mention a few there are, for example, resistance spot welders, testers for lighting arresters, and the betatron type of electron accelerator that includes a special winding which is energized periodically for directing the accelerated electron stream against a target anode. All of these are common to one another to the extent that each includes a winding having an inductance.

This invention offers an improved arrangement for energizing such inductive windings and features the use of a condenser connected in circuit therewith, the condenser having a capacity value for establishing a resonant condition in the circuit at the frequency $f_2$ corresponding to the duration of the current pulses which are desired to be produced in the winding. The resonant circuit is opened and closed alternately in the two current directions by switching means controlled periodically in accordance with another frequency $f_1$; and the oscillatory power for the circuit is supplied by a periodic closing and opening of a connection between the resonant circuit and a source of alternating current at the frequency $f_1$ or else a source of direct current.

Figure 1:
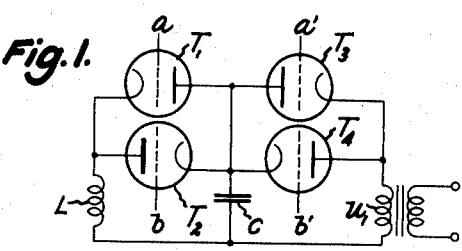
Figure 1A:
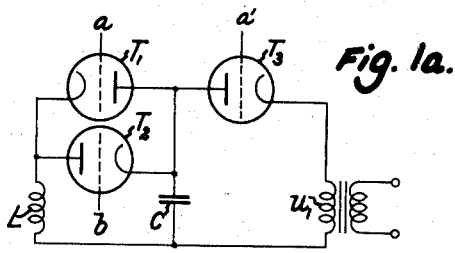
Figure 2:
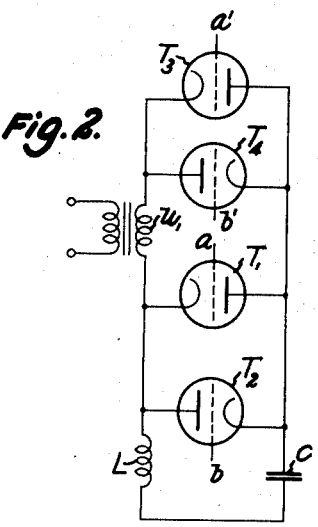
Figure 3:
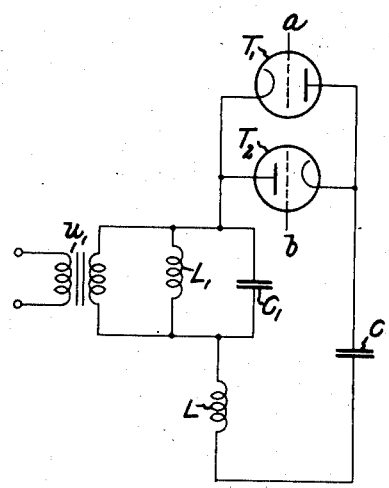
Figure 4:
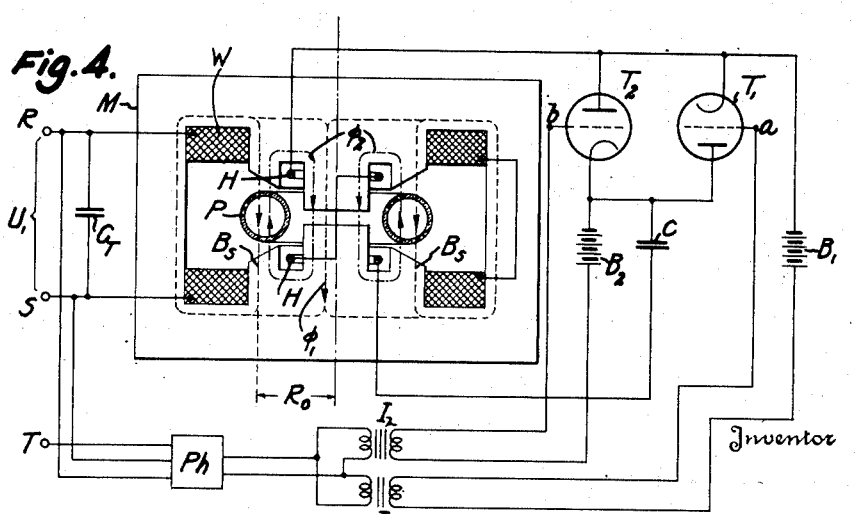

In the accompanying drawings, Fig. 1 is a circuit diagram illustrating one embodiment of the inventive concept; Figs. 1a, 2 and 3 show modifications of the Fig. 1 circuit; Fig. 4 illustrates an application of the invention to a betatron type of electron accelerator; Figs. 5 and 6 are curves relating to the Fig. 4 circuit; and Figs. 7, 8 and 9 illustrate, respectively, adaptations of the circuits shown in Figs. 1, 2 and 3 to the betatron application of Fig. 4.

Referring now to Fig. 1, the inductive winding to be periodically energized is designated L and the condenser C which forms the resonant circuit therewith is periodically short-circuited through winding L by means of two thyratrons $T_1$ and $T_2$ connected in parallel in back-to-front relation. That is to say the cathode of tube $T_2$ and anode of tube $T_1$ are connected together, and similarly the cathode of tube $T_1$ and anode of tube $T_2$ are connected. An alternate positive and negative half wave, respectively, of the discharge current thereby flows upon each ignition of the thyratrons.

In the event there were no losses in the resonant circuit, the condenser voltage would alternate periodically between $+u_c$ and $-u_c$ when the thyratrons $T_1$ and $T_2$ are discharging the condenser C over the coil L. Actually, however, there are some losses and the condenser voltage will diminish unless compensation for the losses is provided for. The preferred way of effecting the necessary compensation is by periodically connecting the condenser to a source having the voltage desired to be maintained. In the Fig. 1 circuit, thyratron tubes $T_3$ and $T_4$ serve this purpose. These tubes are connected in parallel in back-to-front relation between the condenser C and a source of alternating voltage which in this particular embodiment is the secondary $u_1$ of a transformer. Tubes $T_3$ and $T_4$ are triggered by their grids $a'$ and $b'$ in succession during alternate positive and negative halves of the voltage wave at $u_1$ thus charging condenser C twice in each cycle of the voltage wave.

Fig. 1a illustrates a slightly modified arrangement for periodically charging condenser C to full voltage. Here only one thyratron tube $T_3$ is used and its grid $a'$ is triggered during that half of the voltage wave at $u_1$ at which the thyratron is able to carry current. Thus condenser C will be brought to full voltage once in each cycle of the alternating voltage wave. If desired, the alternating voltage wave can be replaced by a direct voltage in the Fig. 1a circuit without changing the method of operation.

Fig. 2 illustrates another embodiment of the invention wherein the source of voltage $u_1$ with the two charging thyratrons $T_3$ and $T_4$ connected in back-to-front relation, are connected in parallel to the two current impulse thyratrons $T_1$ and $T_2$, that are likewise arranged in back-to-front relation, the winding L through which the impulse current is to be sent being arranged in series with condenser C and connected in parallel with thyratrons $T_1$ and $T_2$. The method of operation is exactly the same as in the Fig. 1 circuit. If desired, one of the charging thyratrons, for example, $T_4$ can be omitted as is done in the Fig. 1a circuit and also the alternating voltage at $u_1$ replaced with a source of direct voltage.

Fig. 3 illustrates still another embodiment of the invention in which only two thyratrons are used for both switching in the impulse current to the winding L and periodically recharging condenser C. The source of alternating voltage $u_1$ in this case is connected in series with the inductive winding L and is bridged by another condenser $C_1$. In case of discharging, the effective capacity is diminished in the ratio of $$\frac{1}{1+C/C_1}$$

and the strength of the impulse current is diminished consequently in the ratio of $$\frac{1}{\sqrt{1+C/C_1}}$$

which must be taken into account in calculating voltage and capacities. The capacitive loading of the source of alternating voltage can be compensated out by means of a suitable inductance $L_1$ connected in parallel with the voltage source $u_1$. The use of the choke coil $L_1$ does not materially affect the operation of the current impulse circuit since the ratio of the frequency $f_2$ of the latter to the frequency $f_1$ of the charging voltage $u_1$ is usually very high, i. e. $f_2 >> f_1$.

In Fig. 4, there is illustrated an application of the invention to a betatron or ray transformer type of electron accelerator. A complete description of the betatron can be found in my copending application Ser. No. 751,680, filed June 2, 1947, which matured into U. S. Patent 2,533,859 on December 12, 1950. It suffices to say here that the structure includes an annular tube P into which streams of electrons are injected periodically from an electron "gun" (not shown). A winding W energizd from a source of alternating voltage $u_1$ sets up a periodic, varying magnetic field through the core structure M, the field being composed of two components $B_s$ and $\phi_1$ which take the paths shown by dashed lines on the drawing. The flux component $\phi_1$ causes the injected electrons to be accelerated and the flux component $B_s$ serves to maintain the electron stream on a circular path of radius $R_o$ during their acceleration phase. After the electrons have been fully accelerated, they are removed from the orbit to bombard an anticathode (not shown) or led out of the tube for other uses. Assuming removal by expanding the electron stream radially outward from the orbit, such result can be obtained through use of an auxiliary coil H which when energized produces an auxiliary flux $\phi_2$ which is superimposed upon the main flux $\phi_1$. The effect of this is to weaken the control field $B_s$ and simultaneously strengthen the main flux $\phi_1$, thereby increasing the centrifugal forces on the high velocity electron stream so that the path radius of the stream is increased. The auxiliary winding H is energized when the magnetic flux $\phi_1$ reaches its maximum value and the energizing current impulses are produced by using the voltage induced in the auxiliary winding H by the core flux $\phi_1$ as a source of alternating voltage and by permitting the capacity C to be discharged and charged periodically through two thyratrons $T_1$ and $T_2$. The latter are arranged in parallel, back-to-front, and are connected in series with condenser C across the terminals of winding H which itself is split into two series connected coil sections. As in Fig. 3, the two thyratrons $T_1$ and $T_2$ serve also for switching the current pulses that are the result of changing the charge on condenser C, this being done by triggering the control grids $a$ and $b$ of the tubes in sequence, one in each half of the alternating wave of the voltage $u_1$ as the wave passes through the zero point when the fluxes $\phi_1$ and $B_s$ have their maximum value.

The grid circuits of the thyratrons $T_1$ and $T_2$ are connected to a phaseshifter Ph which is energized from the same three-phase network R, S, T, as that to which the magnetizing winding W of the betatron is connected. The voltage from the phaseshifter is transformed by the two isolating-transformers $I_1$ and $I_2$ and connected to the gridleads $a$, and $b$ of the thyratrons in series with batteries $B_1$ and $B_2$ which serve for supplying a grid bias to the thyratrons. By suitably selecting the bias-voltage the length of the conductive periods ($t_1$ and $t_2$ are shown in Figs. 5 and 6) can be adjusted, whilst the phase position of the ignition relative to the voltage $u_1$ can be determined by the phaseshifter Ph.

The grid control arrangement described above can be used in exactly the same way for the thyratrons $T_1$ and $T_2$ shown in Figs. 1, 1a, 2 and 3. For the charging thyratrons $T_3$, $T_4$ (Figs. 1, 1a, 2) an analogous control arrangement can be employed whereby the ignition point must be set somewhat later than for the thyratrons $T_1$ and $T_2$.

The curves in Fig. 5 show the course of the alternating voltage $u_1$, of the condenser voltage $u_c$, and the currents through the thyratrons $T_1$ and $T_2$. The grid voltages for the two thyratrons $T_1$ and $T_2$ are so selected that they are current conductive during the times $t_1$ and $t_2$. When thyratron $T_2$ ignites, (i. e. at the beginning of the interval $t_2$) condenser C will discharge over the winding H and a current impulse $i_2$ occurs with a frequency $f_2$ corresponding to the capacity and inductance of the resonant circuit. The condenser voltage $u_c$ reaches a value somewhat less than the opposite value and then remains constant until by means of the same thyratron $T_2$ the condenser is charged to the full value of the coil voltage $u_1$. The relative small charging current is indicated by $i_{21}$ and the currents flowing through the thyratron $T_1$ by $i_1$ and $i_{11}$. As is seen, the ohmic charging currents are small in agreement with the slight damping of the oscillatory circuit.

If it is desired to change the instant at which the current impulses are produced, such may be done by shifting the ignition periods of the two thyratrons by means of the phaseshifter Ph, the result being pictured by the curves in Fig. 6 where it will be evident that the thyratrons $T_1$ and $T_2$ now ignite slightly in advance of the zero point on the voltage wave $u_1$. The method of operation does not differ from that already described and the reference letters in Fig. 6 correspond to those in Fig. 5.

In the event that the alternating voltage induced in winding H is insufficient for producing the desired current impulses, circuits similar to those shown in Fig. 1 or 2 can be used. Fig. 7 shows the necessary connections for using a circuit similar to that of Fig. 1, and Fig. 8 shows the connections for a circuit similar to that of Fig. 2 circuit.

Fig. 9 illustrates still another arrangement using a circuit similar to that of Fig. 3 for producing the impulses currents in the auxiliary winding H, the alternating voltage of the winding being increased by the transformer method for charging condenser C, while the current pulses flow through the parallel condenser $C_1$. The transformer T forms a very high impedance for the current impulses due to the high frequency characteristic of the latter and can therefore be neglected.

The grid control circuits for Figs. 7, 8 and 9 have not been included in the drawings because they are exactly similar to those described in detail in connection with Fig. 4.

The invention is of course not limited to the use of thyratrons for switching in the current impulses and condenser charging. Equivalent devices which could be substituted are the three electrode type of spark gap, spark gaps controlled by high frequency, rotary switches and oscillatory contacts, to mention a few of the possibilities. Still other changes in the specifically illustrated circuits may be made without departing from the spirit and scope of the invention as expressed in the appended claims.

I claim:

1. The combination with an electron accelerator of the type comprising an annular tube into which streams of electrons are injected for acceleration on an orbit established within the tube, a magnetic structure including a central core portion extending through the central opening within said tube and annular control pole portions confronting one another at said tube, a main winding on said magnetic structure surrounding said control poles, and a source of alternating voltage connected across said main winding to establish an alternating current therein producing a time varied magnetic field comprising a first component through said central core portion effecting acceleration of said electrons and a second component through said control poles confining the electron streams during the accelerating period to a path of travel along an orbit of substantially fixed radius; of means for effecting a change in the radius of said electron orbit at the end of each acceleration period to discharge the electron stream from the accelerator, said means comprising, an auxiliary winding surrounding only said central core portion and which is inductively coupled with said main coil so as to cause an alternating voltage to be induced therein, a condenser, a pair of grid controlled gaseous discharge valves connected in parallel in back-to-front relation, means connecting said auxiliary winding, condenser and paralleled valves in series to form a series resonant circuit, and means deriving from said source of alternating voltage control voltages for the grids of said valves for rendering said valves periodically conductive in alternation at the end of each electron acceleration period to discharge a current pulse from said condenser through said auxiliary winding thereby effecting a change in the ratio between said flux components and hence a change in radius of the electron orbit, the conductive period of each valve including a peak of said alternating voltage whereby to effect full recharging of said condenser prior to the next discharge thereof.

2. Apparatus for effecting a change in radius of the electron orbit as defined in claim 1 and which further includes an autotransformer having a first winding portion thereof connected in parallel with said auxiliary winding, and a second winding portion and second condenser forming a parallel circuit which is connected in series with said auxiliary winding.

ROLF WIDERÖE.

References Cited in the file of this patent

UNITED STATES PATENTS

| Number | Name | Date |
|---|---|---|
| 2,063,025 | Blumlein | Dec. 8, 1936 |
| 2,088,059 | Schulze-Herringen | July 27, 1937 |
| 2,139,432 | Andrieu | Dec. 6, 1938 |
| 2,199,246 | Pipelow | Apr. 30, 1940 |
| 2,250,170 | Wheeler | July 22, 1941 |
| 2,411,898 | Schelleng | Dec. 3, 1946 |
| 2,415,116 | Stiefel | Feb. 4, 1947 |
| 2,422,575 | Marsh et al. | June 17, 1947 |
| 2,443,619 | Hopper | June 22, 1948 |
| 2,471,168 | Posthumus | May 24, 1949 |
| 2,474,275 | Ostlund | June 28, 1949 |
| 2,480,169 | Westendorp | Aug. 30, 1949 |
| 2,496,979 | Blumlein | Feb. 7, 1950 |